Nov. 8, 1960    L. M. HASSMAN    2,959,098
EYEGLASS TEMPLE RETAINER MEANS
Filed Jan. 31, 1958

INVENTOR.
LAWRENCE M. HASSMAN
BY *Philip S. Hilbert*
ATTORNEY

United States Patent Office 2,959,098
Patented Nov. 8, 1960

2,959,098

EYEGLASS TEMPLE RETAINER MEANS

Lawrence M. Hassman, 147 W. 23rd St., New York, N.Y.

Filed Jan. 31, 1958, Ser. No. 712,488

1 Claim. (Cl. 88—52)

This invention relates to means for retaining the temple members of eyeglasses or spectacles in proper position while being worn, avoiding movement of such eyeglasses or spectacles downwardly, particularly when the wearer is engaged in physical activity tending to cause such movement of the eyeglasses.

A large portion of the eyeglasses being worn includes frames made of plastic and the like, with temple members of various cross sectional configurations and of varying transverse dimensions. An object of this invention is to provide retainer means detachably mountable on the rear portions of said temple members, such retainer means being adapted to be adjusted to tightly engage the temple members irrespective of the cross sectional configuration or the transverse dimensions thereof.

Another object of this invention is to provide retainer means of the character described, which may be readily manipulated to provide a looped temple engaging portion of adjustable dimension and a projecting end portion extending from the looped portion for disposition behind the ear of the wearer.

A further object of this invention is to provide retainer means for eyeglasses which may be quickly and economically fabricated from stock material; which may be sold at nominal cost and which may be readily manipulated by the wearer.

Other objects of this invention will in part be obvious and in part hereinafter pointed out.

In the drawing, Fig. 1 is a plan view of a retainer means for use with the temple bars of eyeglasses, in accordance with the instant invention;

The retainer of the instant invention comprises essentially a flat strip of elastic material such as rubber, the strip being formed with an opening at one end thereof to allow the passage therethrough of the other end of the strip to form a looped portion and a projection extending from the looped portion. Furthermore, the strip is formed to provide means to retain the looped portion in a selected size thereof whereby the looped portion can be adjusted to tightly engage the rear portion of the temple bars of a pair of eyeglasses irrespective of the transverse dimensions of said temple bars.

Figure 2:
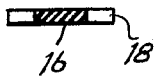
Fig. 2 is a transverse section taken on the line 2—2 of Fig. 1.
Figure 1:
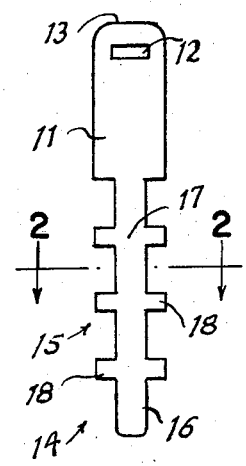

As shown in Fig. 1, the retainer means 10 comprises a flat strip of vulcanized, soft rubber or rubber substitute having elastic qualities. Strip 10 includes a rectangular shaped portion 11 at one end thereof formed with an opening 12 located adjacent end edge 13.

The other end portion 14 of strip 10 comprises a series of successive T-shaped portions 15. Each portion 15 includes the longitudinal portion 16 and the transverse bar 17 which in effect provides pairs of oppositely disposed, longitudinally spaced lateral wing portions 18.

Figure 4:
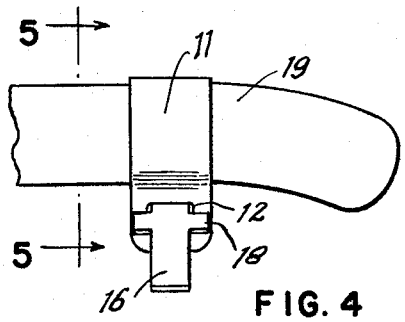
Fig. 4 is an enlarged side elevational view of the rear portion indicated in Fig. 3.
Figure 5:
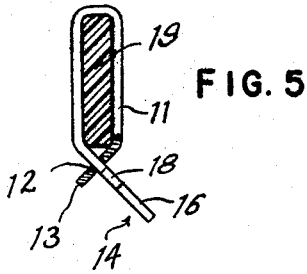
Fig. 5 is a transverse sectional view taken on the line 5—5 of Fig. 4.
Figure 3:
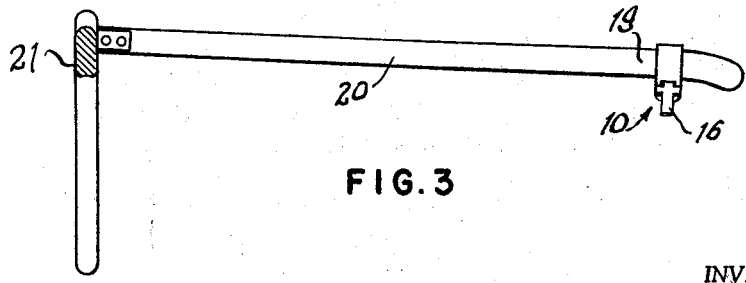
Fig. 3 is a side elevational view of the retainer means in position on the temple bar of a pair of eyeglasses.

As shown in Figs. 3, 4 and 5, the device 10 may be detachably mounted on the rear portions 19 of temple bars 20 on eyeglasses 21. The elastic strip is wrapped around the temple bar with the end portion 14 threaded through the opening 12 to form a looped portion which closely conforms to the temple bar portion 19. Since the strip 10 is quite elastic, the wing portions 18 may be pulled through opening 12 to adjust the size of the resultant loop in accordance with the transverse dimensions of the temple bar portion 19.

It will be apparent, that as shown in Fig. 4, the wing portions 18 provide means for retaining the looped portion of the strip of a dimension necessary to closely conform to the temple bar portion 19; yet allowing the looped portion of the strip 10 to be converted to its original strip form if desired. As a result of such looping arrangement, the end portion 14 of the strip 10 provides a projection extending below the temple bar 19. Such projection will be located behind the ear of the wearer of glasses 21, thus providing retainer means which will be effective to substantially prevent forward movement of said glasses while being worn, even when the wearer is engaged in physical activity.

In the case of temple bars 20 of relatively narrow width, thus requiring relatively small loops on strip 10 and resulting in relatively long end projections; one or more of the T-shaped portions 15 may be readily snipped off to leave a residual projection of reasonable length.

It will be apparent that with a strip 10 of predetermined length, looped retainer means may be formed therefrom to readily fit temple bars of widely varying transverse dimensions. The elasticity of the strip 10 will also insure a closely conforming fit of the looped portion on said temple bars.

As various changes might be made in the embodiment of the invention herein described without departing from the spirit thereof, it is understood that the disclosed embodiment shall be deemed illustrative and not by way of limitation except as set forth in the appended claim.

Having thus disclosed my invention, I claim as new and desire to protect by Letters Patent:

In combination with an eyeglass temple bar, retainer means comprising an elongated elastic member, means on one end of said member engageable with means on intermediate portions of said member for forming a loop of adjustable extent to receive therein an end portion of said temple bar, said loop being adjusted to closely conform to said temple bar portion, the other end of said member projecting beyond said loop to provide a flexible end retainer portion depending below said temple bar portion, said means on one end of said elongated elastic member comprising an opening at one end thereof for passing the other end of said elastic member therethrough, and said elastic member being formed with notches on the lateral edges thereof comprising said means on said intermediate portions of said member to provide lateral wings for retaining that portion of the elastic member passing through the opening therein at selected longitudinal spaced points.

References Cited in the file of this patent

UNITED STATES PATENTS

| | | |
|---|---|---|
| 1,945,932 | Caley | Feb. 6, 1934 |
| 2,361,506 | Smith | Oct. 31, 1944 |
| 2,626,538 | Frum | Jan. 27, 1953 |